United States Patent
Silbert et al.

(10) Patent No.: US 12,105,107 B2
(45) Date of Patent: Oct. 1, 2024

(54) JIG FOR POSITIONING AND SECURING A FIRST CONSOLE WITH RESPECT TO A SECOND CONSOLE

(71) Applicant: Gen-Probe Incorporated, San Diego, CA (US)

(72) Inventors: Rolf Silbert, Del Mar, CA (US); HongRan Peng, San Diego, CA (US)

(73) Assignee: GEN-PROBE INCORPORATED, San Diego, CA (US)

( * ) Notice: Subject to any disclaimer, the term of this patent is extended or adjusted under 35 U.S.C. 154(b) by 0 days.

(21) Appl. No.: 18/288,789

(22) PCT Filed: Jan. 18, 2023

(86) PCT No.: PCT/US2023/011035
§ 371 (c)(1),
(2) Date: Oct. 27, 2023

(87) PCT Pub. No.: WO2023/141147
PCT Pub. Date: Jul. 27, 2023

(65) Prior Publication Data
US 2024/0219415 A1    Jul. 4, 2024

Related U.S. Application Data

(60) Provisional application No. 63/301,928, filed on Jan. 21, 2022.

(51) Int. Cl.
*G01N 35/04* (2006.01)
*G01N 35/00* (2006.01)
*G01N 35/10* (2006.01)

(52) U.S. Cl.
CPC ......... *G01N 35/04* (2013.01); *G01N 35/1011* (2013.01); *G01N 2035/00326* (2013.01)

(58) Field of Classification Search
CPC ............... G01N 35/04; G01N 35/1011; G01N 2035/00326; F16B 1/00
See application file for complete search history.

(56) References Cited

U.S. PATENT DOCUMENTS 7,485,264 B2    2/2009    Itoh
8,147,778 B2    4/2012    Pedrazzini
(Continued)

FOREIGN PATENT DOCUMENTS

JP          S6048236 A   *  3/1986
WO     2019/014239 A1      1/2019
(Continued)

OTHER PUBLICATIONS

International Search Report and Written Opinion dated Apr. 18, 2023 in International Application No. PCT/US2023/011035 (14 pages).

*Primary Examiner* — Jill A Warden
*Assistant Examiner* — John McGuirk
(74) *Attorney, Agent, or Firm* — Rothwell, Figg, Ernst & Manbeck, P.C.; Richard Wydeven; Charles B. Cappellari

(57) ABSTRACT

A jig assembly for connecting first and second consoles with predefined relative positioning includes first and second positioning pins attached or attachable to the first console and a positioning connection bracket attached or attachable to the second console and including a longitudinal span and first and second transverse legs including first and second pin recesses at respective free ends thereof. The first and second pin recesses receive the first and second positioning pins, respectively, when the first and second consoles are moved laterally toward each other. The first and second transverse legs may be attached to the first console with a first and second leg attachment brackets, respectively. The first and second positing pins and the first and second leg (Continued)

attachment brackets may be fixed with respect to the first console by attachment to a mounting rail that is fixed to the first console.

22 Claims, 10 Drawing Sheets

(56) References Cited

U.S. PATENT DOCUMENTS

| | | |
|---|---|---|
| 8,512,636 B2 | 8/2013 | Blanton et al. |
| 8,534,456 B2 | 9/2013 | Kimura et al. |
| 8,731,712 B2 | 5/2014 | Hagen et al. |
| 9,448,245 B2 | 9/2016 | Takano et al. |
| 9,651,571 B2 | 5/2017 | Sasaki et al. |
| 9,732,374 B2 | 8/2017 | Buse et al. |
| 9,766,258 B2 | 9/2017 | Itoh |
| 9,776,811 B2 | 10/2017 | Itoh |
| 10,041,965 B2 | 8/2018 | Pedrazzini |
| 10,386,381 B2 | 8/2019 | Lair |
| 2002/0028157 A1 | 3/2002 | Takahashi et al. |
| 2006/0083660 A1 | 4/2006 | Schorno et al. |
| 2006/0222573 A1 | 10/2006 | Itoh |
| 2009/0246081 A1* | 10/2009 | Nichols ............ B01L 9/02 422/63 |
| 2013/0023387 A1* | 1/2013 | Webb ............ A63B 21/1627 482/87 |
| 2017/0153262 A1 | 6/2017 | Lair |
| 2017/0248623 A1 | 8/2017 | Kaeppeli et al. |
| 2017/0254827 A1 | 9/2017 | Walker et al. |
| 2018/0052183 A1 | 2/2018 | Takaya et al. |
| 2021/0061584 A1 | 3/2021 | Silbert |
| 2021/0215730 A1 | 7/2021 | Yamaguchi et al. |
| 2022/0010254 A1 | 1/2022 | Gilligan et al. |

FOREIGN PATENT DOCUMENTS

| | | |
|---|---|---|
| WO | 2020/226969 A2 | 11/2020 |
| WO | 2021/216932 A1 | 10/2021 |
| WO | 2022/087233 A1 | 4/2022 |

* cited by examiner

JIG FOR POSITIONING AND SECURING A FIRST CONSOLE WITH RESPECT TO A SECOND CONSOLE

CROSS REFERENCE TO RELATED APPLICATIONS

This application is a 35 U.S.C. § 371 National Stage of International Patent Application No. PCT/US2023/011035, filed Jan. 18, 2023, which claims priority to U.S. Provisional Patent Application No. 63/301,928, filed on Jan. 21, 2022. The above-identified applications are incorporated by this reference.

FIELD OF THE DISCLOSURE

This disclosure relates to a jig for positioning and securing a first console with respect to a second console.

BACKGROUND

Various types of analytical tests or assays are performed in laboratories for patient diagnosis and to guide therapy. Such assays may be performed by analysis of a liquid or liquefied sample obtained from a patient and are typically performed with automated analyzers onto which receptacles, such as tubes or vials, containing patient samples have been loaded. The analyzer may extract an amount of the sample from the receptacle, combine a purified or unpurified form of the extracted sample with various reagents in a special reaction vessel (e.g., tube, well, vial, cuvette, etc.), expose the resulting reaction mixture to reaction conditions and detect a measurable output (e.g., an optical output), if any, from which an assay result may be determined.

In some laboratories, an automated or modular approach may be employed in which instruments are linked together. A lab automation system conveys samples, e.g., via a conveyor track, between a sample processing module or modules and an analyzer or analyzers. Different analyzers can be configured to perform specific types of assays. Samples may be provided to the sample processing modules and analyzers by an operator first placing the sample receptacles, typically carried in a rack holding multiple receptacles, into an input module. The receptacles may then be automatically transferred from the input module to the conveyor track, such as with a robotic mechanism, and the receptacles may then be conveyed by the track to the sample processing modules and analyzer(s) configured to perform the assays(s) required for each sample. Receptacles may be transferred, typically one at a time, from the track to an analyzer so that an amount of sample material can be extracted from the receptacle and processed, e.g, assayed within the analyzer. After sample material has been extracted from each receptacle to perform the required assay(s), the sample receptacle may be transferred back to the conveyor track. The receptacle may be conveyed to an output module where each receptacle is be transferred, e.g., by a transfer robot, from the track to the output module, e.g, to a rack within the output module configured to hold multiple receptacles, and the receptacles can then be removed from the output module by an operator.

Each of the analyzers and other processing modules of a lab automation system, and portions of the conveyor itself, may be housed or supported within a console, which may comprise a cabinet, a frame, and/or a housing that supports functional components of the analyzer, processing module, or conveyor and may provide an enclosure, or partial enclosure for these functional components. Each console may be supported on the floor of the laboratory or on a surface elevated above the floor, such as a tabletop, desktop, or countertop.

To facilitate the transfer of sample receptacles, or other articles, between the conveyor track and the analyzer or other processing module, each console of the respective lab automation system component is preferably precisely positioned with respect to the console of a complementary component to which, or from which, sample receptacles or other articles are being transferred. Such positioning requires proper alignment of and spacing between complementary consoles in accordance with the transfer mechanism(s) that transfer receptacles or other articles between the consoles. After the consoles are precisely positioned, they are preferably connected to each other to prevent the consoles from moving with respect to each other and thereby spoiling the precise positioning of the consoles.

SUMMARY

The following presents a simplified summary of the following disclosure in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Aspects of the disclosure are embodied in a system that may include a conveyor console including a conveyor configured to transport fluid receptacles, an instrument console, a transport shuttle coupled to the instrument console and configured to transport fluid receptacles removed from the conveyor into and out of the instrument console, and a jig assembly for positioning the instrument console with respect to the conveyor console and connecting the instrument console to the conveyor console. In some embodiments, the jig assembly includes first and second positioning pins configured to be releasably fixed to the instrument console at horizontally spaced apart positions on opposed sides of the transport shuttle, a positioning connection bracket attached to the conveyor console that may include a longitudinal span and first and second transverse legs extending laterally from longitudinally spaced-apart locations on the longitudinal span, a first pin recess formed in a free end of the first transverse leg, wherein the first positioning pin may be received within the first pin recess, a second pin recess formed in a free end of the second transverse leg, wherein the second positioning pin may be received within the second pin recess, a first leg attachment bracket connecting the first transverse leg to the instrument console, and a second leg attachment bracket connecting the second transverse leg to the instrument console.

In some embodiments, the jig assembly may include a mounting rail attached to the instrument console in a horizontal, longitudinally-extending orientation, and the mounting rail may include a longitudinally-extending top track formed at a top side thereof. In some embodiments each of the first and second positioning pins may be configured to be slidably coupled to the top track and to be non-slidably fixed to the mounting rail to fix the respective first and second positioning pins with respect to the instrument console. The first positioning pin may be secured to a first mounting block, and the first mounting block may be fixed to the mounting rail by fasteners extending through the first mounting block into T-slot nuts disposed in the top track. The second positioning pin may be secured to a second mounting block, and the second mounting block may be fixed to the mounting rail by fasteners extending through the second mounting block into T-slot nuts disposed in the top track. In some embodiments, the mounting rail may have a longitudinally-extending side track formed at a side thereof, and each of the first and second leg attachment brackets may be fixed to the side track of the mounting rail. In some embodiments, the mounting rail may be formed from an extrusion profile rail.

In some embodiments, the first pin recess may be defined by an opening that that may be wider than a width of the first positioning pin, a pin capture portion that may be about as wide as the width of the first positioning pin to permit the first positioning pin to move laterally into and out of the pin capture portion but restrict longitudinal movement of the first positioning pin within the pin capture portion, and inwardly angled sides extending from the opening to the pin capture portion. In some embodiments, the second pin recess may be wider than a width of the second positioning pin to permit the second positioning pin to move longitudinally within the second pin recess.

In some embodiments, the instrument console may include a housing wall and a receptacle portal formed in the housing wall through which fluid receptacles may be transported into or out of the instrument console by the transport shuttle.

In some embodiments, the conveyor console may include a transfer robot configured to transfer fluid receptacles from a transfer position on the conveyor to the transport shuttle and from the transport shuttle to the transfer position on the conveyor. In some embodiments, the transfer robot may include a pick and place gripper.

In some embodiments, the first and second transverse legs may be substantially perpendicular to the longitudinal span.

In some embodiments, the system may further include first and second connecting brackets for connecting the positioning connection bracket to the conveyor console.

In some embodiments, the system may further include a pin installation jig, and the pin installation jig may include a frame, with a clearance opening formed therein, an installation clamp slidably attached to the frame and extending into the clearance opening, a first pin positioner attached to the frame and including a first pin location hole formed therein, and a second pin positioner attached to the frame and including a second pin location hole formed therein. In some embodiments, the pin installation jig is configured to be coupled to the instrument console with the transport shuttle disposed within the clearance opening, and the installation clamp is configured to bear against one side of the transport shuttle to urge a datum of the pin installation jig against an opposite side of the transport shuttle. In some embodiments, the first positioning pin is configured to be moved into alignment with and through the first pin location hole of the first pin positioner before the first positioning pin is fixed with respect to the instrument console, and the second positioning pin is configured to be moved into alignment with and through the second pin location hole of the second pin positioner before the second positioning pin is fixed with respect to the instrument console. In some embodiments, the installation clamp may be slidably mounted to the frame and may be spring biased into contact with the transport shuttle. In some embodiments, the pin installation jig may include a thumb screw that extends through an opening formed in the installation clamp and into the frame to be selectively tightened to retain the installation clamp in a retracted position.

Aspects of the disclosure are embodied in a jig assembly for connecting a first console to a second console at a predefined relative positioning of the first console with respect to the second console. In some embodiments, the jig assembly may include first and second positioning pins, and each of the first and second positioning pins may be configured to be independently fixed with respect to the first console at horizontal, longitudinally-spaced-apart positions. The jig assembly may include a positioning connection bracket attachable to the second console in a horizontal orientation. The positioning connection bracket may include a longitudinal span extending in a longitudinal direction and first and second transverse legs extending in a lateral direction from longitudinally spaced-apart locations on the longitudinal span. The first transverse leg may include a first pin recess formed in a free end thereof, and the second transverse leg includes a second pin recess formed in a free end thereof. In some embodiments, the first and second pin recesses are configured to receive the first and second positioning pins, respectively, when the first and second positioning pins fixed with respect to the first console are aligned with the first and second pin recesses, respectively, of the positioning connection bracket attached to the second console and the first and second consoles are moved relatively toward each other in the lateral direction.

In some embodiments, the jig assembly may include a first leg attachment bracket for attaching the first transverse leg to the first console and a second leg attachment bracket for attaching the second transverse leg to the first console.

In some embodiments, the jig assembly may include a mounting rail configured to be attached to the first console in a horizontal, longitudinally-extending orientation, and the mounting rail may include a longitudinally-extending top slide track formed at a top side thereof. Each of the first and second positioning pins may be configured to be slidably coupled to the top slide track and to be non-slidably fixed to the mounting rail to fix the respective first and second positioning pins with respect to the first console. The first positioning pin may be secured to a first mounting block, and the first mounting block may be fixed to the mounting rail by fasteners extending through the first mounting block into T-slot nuts disposed in the top track. The second positioning pin may be secured to a second mounting block, and the second mounting block may be fixed to the mounting rail by fasteners extending through the second mounting block into T-slot nuts disposed in the top track. In some embodiments, the mounting rail may have a longitudinally-extending side track formed at a side thereof, and each of the first and second leg attachment brackets may be fixed to the side track of the mounting rail. In some embodiments, the mounting rail may have a longitudinally-extending side slide track formed at a side thereof, and each of the first leg attachment bracket and the second leg attachment bracket may be configured to be slidably coupled to the side slide track and to be non-slidably fixed to the mounting rail to fix the respective first and second leg attachment brackets with respect to the first console. In some embodiments, the mounting rail comprises an extrusion profile rail.

In some embodiments, the first pin recess may be defined by an opening that that may be wider than a width of the first positioning pin, a pin capture portion that may be about as wide as the width of the first positioning pin to permit the first positioning pin to move laterally into and out of the pin capture portion but restrict longitudinal movement of the first positioning pin within the pin capture portion, and inwardly angled sides extending from the opening to the pin capture portion. In some embodiments, the second pin recess may be wider than a width of the second positioning pin to permit the second positioning pin to move longitudinally within the second pin recess.

In some embodiments, the first and second transverse legs are substantially perpendicular to the longitudinal span.

In some embodiments, jig assembly may include first and second connecting brackets for connecting the positioning connection bracket to the second console.

Aspects of the disclosure are embodied in a system that may include a first console, a second console holding one or more articles, an article transport configured to transport articles removed from the second console to the first console, and a jig assembly for positioning the first console with respect to the second console and connecting the first console to the second console. In some embodiments, the jig assembly may include first and second positioning pins attached to the first console at horizontally spaced apart positions on opposed sides of the article transport, a positioning connection bracket attached to the second console that may include a longitudinal span and first and second transverse legs extending laterally from longitudinally spaced-apart locations on the longitudinal span, a first pin recess formed in a free end of the first transverse leg, wherein the first positioning pin may be received within the first pin recess, a second pin recess formed in a free end of the second transverse leg, wherein the second positioning pin may be received within the second pin recess, a first leg attachment bracket connecting the first transverse leg to the first console, and a second leg attachment bracket connecting the second transverse leg to the first console.

In some embodiments, the jig assembly may include a mounting rail attached to the first console in a horizontal, longitudinally-extending orientation, and the mounting rail may include a longitudinally-extending top track formed at a top side thereof. In some embodiments, each of the first and second positioning pins is configured to be slidably coupled to the top track and to be non-slidably fixed to the mounting rail to fix the respective first and second pins with respect to the first console. In some embodiments, the mounting rail has a longitudinally-extending side track formed at a side thereof, and wherein each of the first and second leg attachment brackets may be fixed to the side track of the mounting rail. In some embodiments, the mounting rail comprises an extrusion profile rail.

In some embodiments, the first pin recess may be defined by an opening that may be wider than a width of the first positioning pin, a pin capture portion that may be about as wide as the width of the first positioning pin to permit the first positioning pin to move laterally into and out of the pin capture portion but restrict longitudinal movement of the first positioning pin within the pin capture portion, and inwardly angled sides extending from the opening to the pin capture portion. In some embodiments, the second pin recess may be wider than a width of the second positioning pin to permit the second positioning pin to move longitudinally within the second pin recess.

In some embodiments, the first console may include a housing wall and a receptacle portal formed in the housing wall through which articles may be transported into or out of the first console by the article transport.

In some embodiments, the second console may include a transfer robot configured to transfer articles from a transfer position within the second console to the article transport and from the article transport to the transfer position. In some embodiments, the transfer robot may include a pick and place gripper.

In some embodiments, the first and second transverse legs may be substantially perpendicular to the longitudinal span.

In some embodiments, the second console may include a conveyor console including a conveyor configured to transport articles.

In some embodiments, the system may include connecting brackets for connecting the positioning connection bracket to the second console.

In some embodiments, the system may include a pin installation jig, and the pin installation jig may include a frame, with a clearance opening formed therein, an installation clamp slidably attached to the frame and extending into the clearance opening, a first pin positioner with a pin location hole formed therein, and a second pin positioner with a pin location hole formed therein. In some embodiments, the pin installation jig is configured to be coupled to the first console with the article transport disposed within the clearance opening, and the installation clamp is configured to bear against one side of the article transport to urge a datum of the pin installation jig against an opposite side of the article transport. In some embodiments, the first positioning pin is configured to be moved into alignment with and through the pin location hole of the first pin positioner before the first positioning pin is fixed with respect to the first console, and the second positioning pin is configured to be moved into alignment with and through the pin location hole of the second pin positioner before the second positioning pin is fixed with respect to the first console. In some embodiments, the installation clamp may be slidably mounted to the frame and may be spring biased into contact with the article transport. In some embodiments, the pin installation jig may include a thumb screw that extends through an opening formed in the installation clamp and into the frame to be selectively tightened to retain the installation clamp in a retracted position.

Aspects of the disclosure are embodied in a method for positioning a first console with respect to a second console and connecting the first console to the second console. The method may include the steps of (a) attaching first and second positioning pins to the first console at horizontally spaced apart positions on opposed sides of an intervening structure extending between the first console and the second console, (b) attaching a positioning connection bracket to the second console, wherein the positioning connection bracket may include a longitudinal span and first and second transverse legs extending laterally from longitudinally spaced-apart locations on the longitudinal span, and the first transverse leg includes a first pin recess formed in a free end thereof and the second transverse leg includes a second pin recess formed in a free end thereof, (c) aligning the first pin recess the with first positioning pin, (d) aligning the second pin recess with the second positioning, (e) moving one or both of the first and second consoles toward each other in the lateral direction until the first positioning pin is received in the first pin recess and the second positioning pin is received in the second pin recess, (f) connecting the first transverse leg to the first console, and (g) connecting the second transverse leg to the first console.

In some embodiments, step (f) may include connecting the first transverse leg to the first console with a first leg attachment bracket, and step (g) may include connecting the second transverse leg to the first console with a second leg attachment bracket.

In some embodiments, step (a) may include coupling a pin installation jig to the first console with the article transport disposed within a clearance opening formed in the pin installation jig and urging the pin installation jig in the longitudinal direction so that a datum of the installation jig bears against a side of the intervening structure, moving the first positioning pin into alignment with, and inserting the first positioning pin through, a first pin location hole of the pin installation jig and then fixing the first positioning pin with respect to the first console, and moving the second positioning pin into alignment with, and inserting the second positioning pin through, a second pin location hole of the pin installation jig and then fixing the second positioning pin with respect to the first console.

In some embodiments, step (a) may include attaching a mounting rail to the first console in a horizontal, longitudinally-extending orientation, and the mounting rail may include a longitudinally-extending top track formed at a top side thereof, slidably coupling the first and second positioning pins to the top track, sliding each of the first and second positioning pins along the top track to respective, desired positions, and fixing the respective first and second positioning pins to the mounting rail.

In some embodiments, step (b) may include attaching the positioning connection bracket to the second console with first and second connecting brackets.

In some embodiments, the intervening structure comprises an article transport, and the method may include transferring articles between the first and second consoles with the article transport.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification.

BRIEF DESCRIPTION OF THE DRAWINGS

The accompanying drawings, which are incorporated herein and form part of the specification, illustrate some embodiments of the subject matter of this disclosure. In the drawings, like reference numbers indicate identical or functionally similar elements.

DETAILED DESCRIPTION

Figure 1:
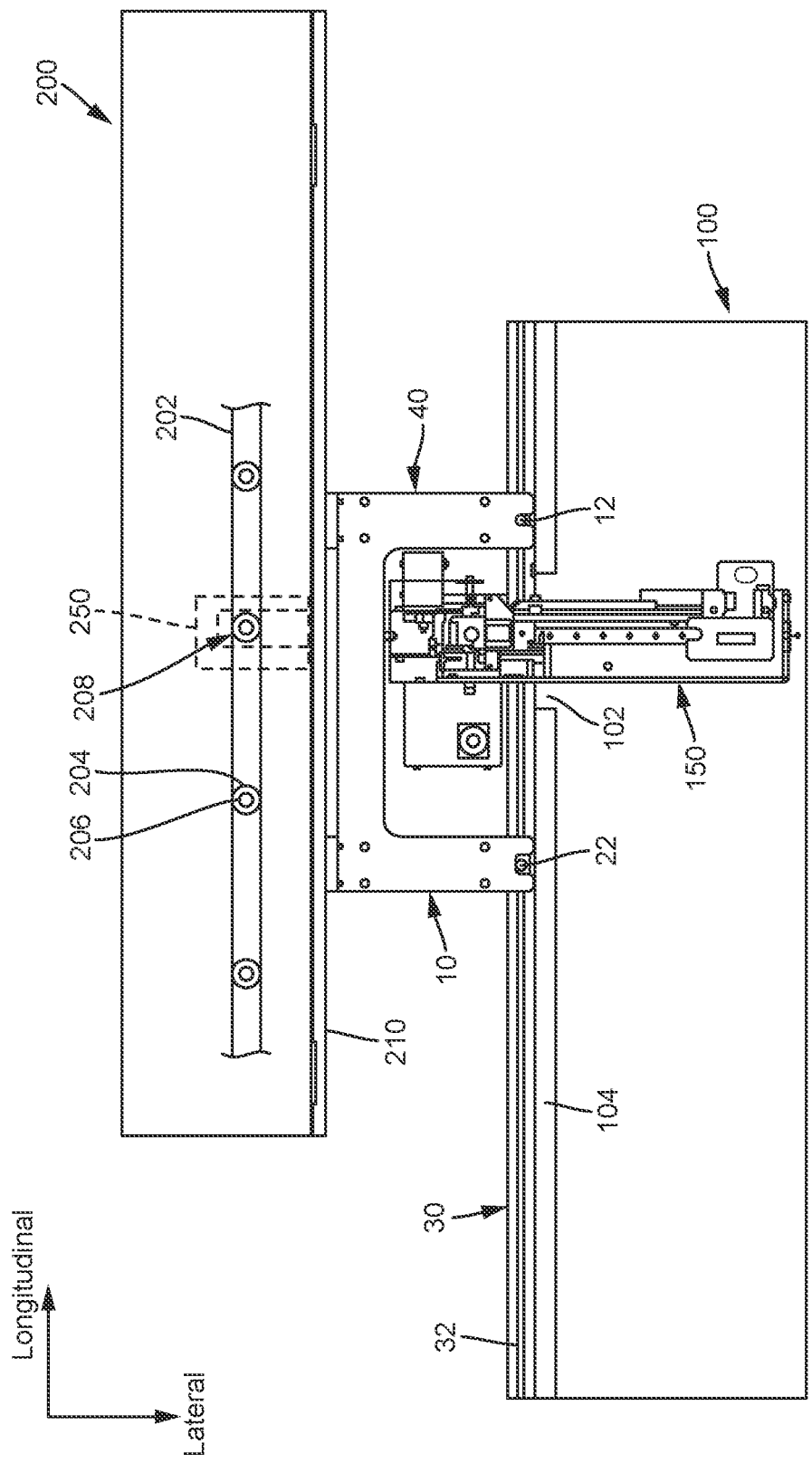
FIG. 1 is a top plan view of first and second consoles and a jig assembly for positioning and securing the first console with respect to the second console.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Definitions

Unless defined otherwise, all terms of art, notations, and other technical terms or terminology used herein have the same meaning as is commonly understood by one of ordinary skill in the art to which this disclosure belongs. All patents, applications, published applications, and other publications referred to herein are incorporated by reference in their entirety. If a definition set forth in this section is contrary to, or otherwise inconsistent with, a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

References in the specification to "one embodiment," "an embodiment," a "further embodiment," "an exemplary embodiment," "some aspects," "a further aspect," "aspects," etc., indicate that the embodiment or aspect described may include a particular feature, structure, or characteristic, but every embodiment encompassed by this disclosure may not necessarily include the particular feature, structure, or characteristic. Moreover, such phrases are not necessarily referring to the same embodiment. Further, when a particular feature, structure, or characteristic is described in connection with an embodiment, such feature, structure, or characteristic is also a description in connection with other embodiments, whether or not explicitly described.

To the extent used herein, the term "sample" refers to any substance suspected of containing at least one analyte of interest. The analyte of interest may be, for example, a nucleic acid, a protein, a prion, a chemical, or the like. The substance may be derived from any source, including animal, an industrial process, the environment, a water source, a food product, or a solid surface (e.g., surface in a medical facility). Substances obtained from animals may include, for example, blood or blood products, urine, mucus, sputum, saliva, semen, tears, pus, stool, nasopharyngeal or genitourinary specimen obtained with a swab or other collective device, and other bodily fluids or materials. The term "sample" will be understood to mean a specimen in its native form or any stage of processing.

To the extent used herein, the term "receptacle" or "fluid receptacle" refers to any type of fluid container, including, for example, a tube, a vial, a cuvette, a well or cartridge or other article having one or more wells formed therein or attached thereto, a microtiter plate, etc., that is configured to contain a sample or another fluid (collectively referred to herein as fluid) Tubes may be cylindrical (i.e, circular in cross-section) or non-cylindrical and may have flat or rounded closed ends. Non-limiting examples of exemplary receptacles include, for example, Aptima® urine specimen transport tube, Aptima® specimen transfer tube, BD Vacutainer®, etc.

To the extent used herein, the term "adjacent" refers to being near (spatial proximity) or adjoining. Adjacent objects or portions thereof can be spaced apart from one another or can be in actual or direct contact with one another. In some instances, adjacent objects or portions thereof can be coupled to one another or can be formed integrally with one another.

To the extent used herein, the terms "substantially" and "substantial" mean to a considerable degree or extent. When used in conjunction with, for example, an event, circumstance, characteristic, or property, the terms can refer to instances in which the event, circumstance, characteristic, or property occurs precisely as stated as well as instances in which the event, circumstance, characteristic, or property occurs to a close approximation, such as accounting for typical tolerance levels or variability of the embodiments described herein.

To the extent used herein, the terms "optional" and "optionally" mean that the subsequently described, component, structure, element, event, circumstance, characteristic, property, etc. may or may not be included or occur and that the subject matter described herein includes instances where the component, structure, element, event, circumstance, characteristic, property, etc. is included or occurs and instances in which it is not or does not.

To the extent used herein, the term "analyte" refers to a molecule or substance that is detected or subjected to analysis in an assay. Exemplary analytes include nucleic acids, polypeptides, proteins, antigens, and prions.

To the extent used herein, the term "assay" refers to a procedure for detecting and/or quantifying an analyte in a sample. A sample comprising or suspected of comprising the analyte is contacted with one or more reagents and subjected to conditions permissive for generating a detectable signal informative of whether the analyte is present or an amount (e.g., mass or concentration) of the analyte in the sample.

To the extent used herein, the term "analyzer" refers to an automated instrument that is capable of performing one or more steps of an assay, including the step of determining the presence or absence of one or more analytes suspected of being present in a fluid sample.

To the extent used herein, the terms "conveyor," "conveyance," or "track" refer to a mechanical apparatus for transporting articles (e.g., containers, receptacles, and/or carriers, which may or may not be holding receptacles) from one location to another along a defined path. Non-limiting examples of exemplary conveyors include robots, belts (such as, for example, a moving belt, a shuttle/carriage moving on a track, rail, etc.), magnetic devices, gear systems, cable systems, vacuum systems, automated cars with wheels, etc. The terms may be used to refer to entire apparatus for transporting the article from a first location to a second location or to a discrete portion, or extent, of the apparatus.

To the extent used herein, the term "molecular assay" refers to a procedure for specifically detecting and/or quantifying a target nucleic acid. A sample comprising or suspected of comprising the target nucleic acid is contacted with one or more reagents, typically including at least one reagent specific for the target nucleic acid, and subjected to conditions permissive for generating a detectable signal informative of whether the target nucleic acid is present. For example, where the molecular assay includes an amplification reaction, such as a polymerase chain reaction (PCR), the reagents include primers that may be specific for the target nucleic acid, and the generation of a detectable signal can be accomplished, at least in part, by providing a labeled probe that hybridizes to the amplicon produced by the primers in the presence of the target nucleic acid. Alternatively, the reagents can include an intercalating dye for detecting the formation of double-stranded nucleic acids. Intercalating dyes are not specific for any particular nucleic acid.

To the extent used herein, the term "reagent" refers to any substance or mixture that participates in an assay, other than sample material and products of the assay. Exemplary reagents for use in a molecular assay include nucleotides, enzymes, primers, probes, and salts.

According to some embodiments, suitable reactions or processes can comprise one or more of a sample preparation process, a washing process, a sample purification process, a pre-amplification process, a pre-amplified product purification process, an amplification process, an amplified product purification process, a separation process, a sequencing process, a sequencing product purification process, a labeling process, a detecting process, or the like. Processing components can comprise sample preparation components, purification components, pre-amplification reaction components, amplification reaction components, sequencing reaction components, or the like. The skilled artisan can readily select and employ suitable components for a desired reaction or process, without undue experimentation.

To the extent used herein, the terms "about" or "approximately" apply to all numeric values and terms indicating specific physical orientations or relationships such as horizontal, vertical, parallel, perpendicular, concentric, or similar terms, specified herein, whether or not explicitly indicated. This term generally refers to a range of numbers, orientations, and relationships that one of ordinary skill in the art would consider as a reasonable amount of deviation to the recited numeric values, orientations, and relationships (i.e., having the equivalent function or result) in the context of the present disclosure. For example, and not intended to be limiting, this term can be construed as including a deviation of ±10 percent of the given numeric value, orientation, or relationship, provided such a deviation does not alter the end function or result of the stated value, orientation, or relationship. Therefore, under some circumstances as would be appreciated by one of ordinary skill in the art a value of about or approximately 1% can be construed to be a range from 0.9% to 1.1%.

This description may use various terms describing relative spatial arrangements and/or orientations or directions in describing the position and/or orientation of a component, apparatus, location, feature, or a portion thereof or direction of movement, force, or other dynamic action. Unless specifically stated, or otherwise dictated by the context of the description, such terms, including, without limitation, top, bottom, above, below, under, on top of, upper, lower, left, right, in front of, behind, beneath, next to, adjacent, between, horizontal, vertical, diagonal, longitudinal, transverse, radial, axial, clockwise, counter-clockwise, etc., are used for convenience in referring to such component, apparatus, location, feature, or a portion thereof or movement, force, or other dynamic action represented in the drawings and are not intended to be limiting.

Unless otherwise indicated, or the context suggests otherwise, terms used herein to describe a physical and/or spatial relationship between a first component, structure, or portion thereof and a second component, structure, or portion thereof, such as, attached, connected, fixed, joined, linked, coupled, or similar terms or variations of such terms, shall encompass both a direct relationship in which the first component, structure, or portion thereof is in direct contact with the second component, structure, or portion thereof or there are one or more intervening components, structures, or portions thereof between the first component, structure, or portion thereof and the second component, structure, or portion thereof.

Unless otherwise stated, any specific dimensions mentioned in this description are merely representative of an exemplary implementation of a device embodying aspects of the disclosure and are not intended to be limiting.

All possible combinations of elements and components described in the specification or recited in the claims are contemplated and considered to be part of this disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Figure 2:
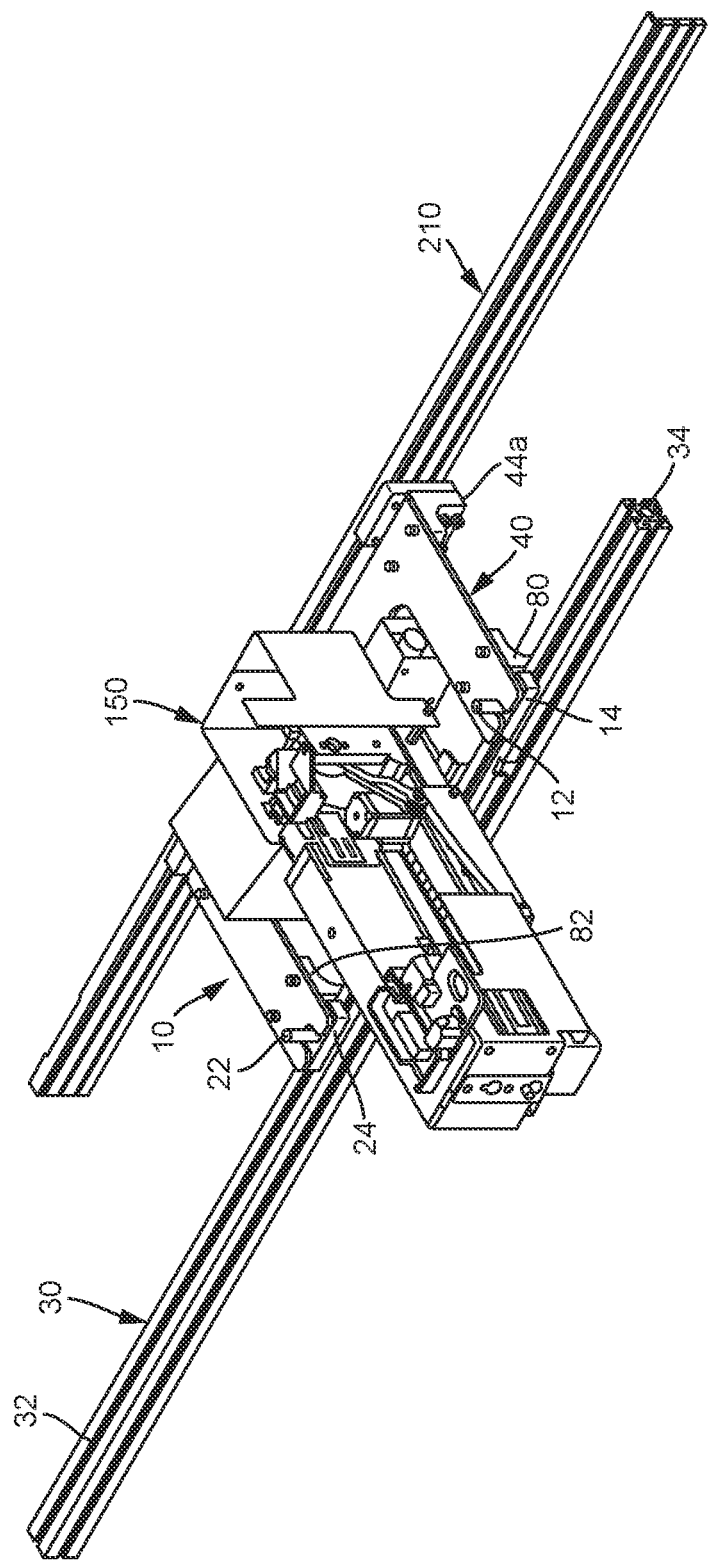
FIG. 2 is a top perspective view of the jig assembly with the first and second consoles omitted.
Figure 3:
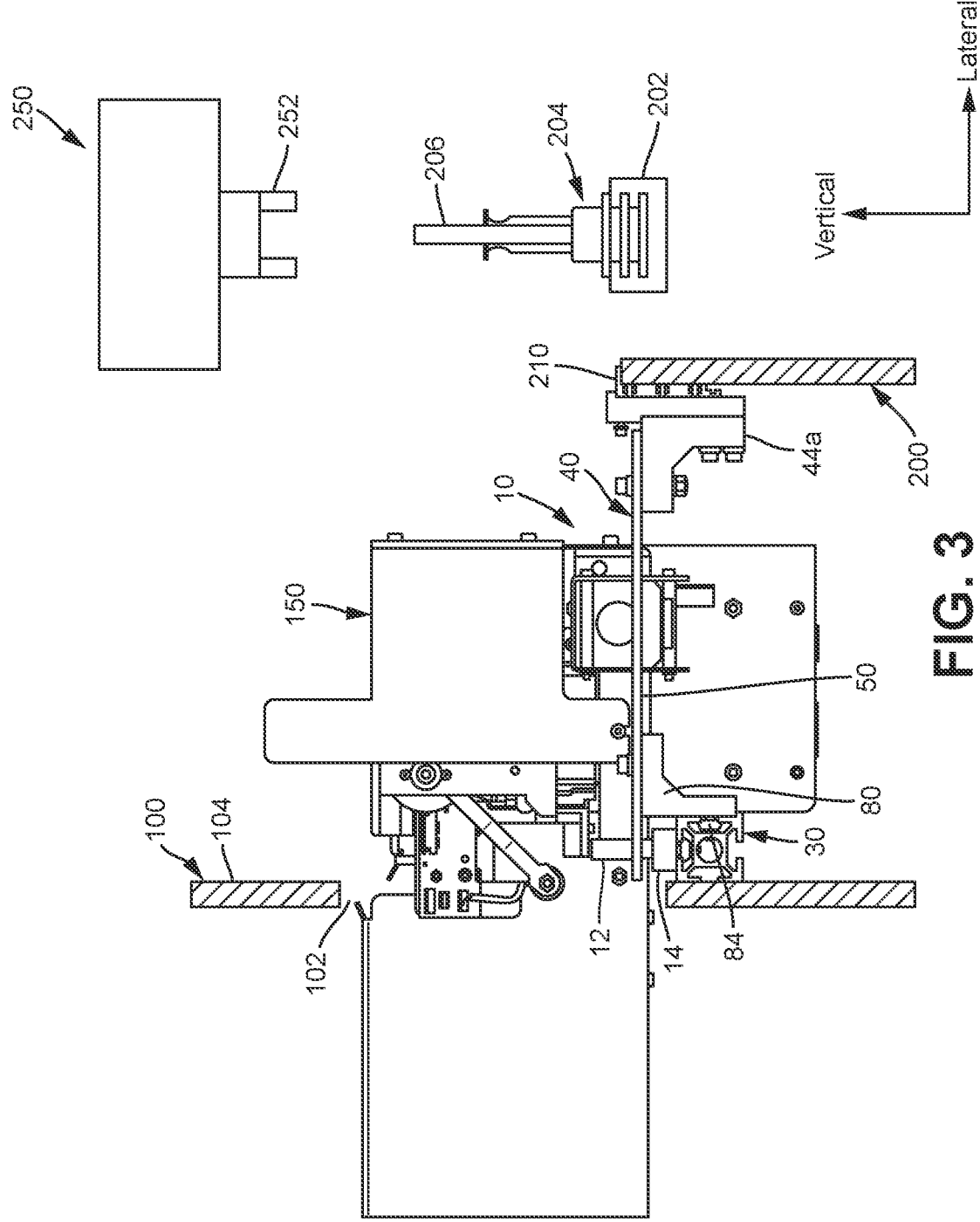
FIG. 3 is a partial side and cross-sectional view of the jig assembly and first and second consoles.

FIG. 1 is a top plan view of a first console 100, an article transport 150, a second console 200, and a jig assembly 10. FIG. 2 is a perspective view of the jig assembly 10 and the article transport 150 with the first and second consoles 100, 200 omitted from the figure. FIG. 3 is a partial side view of the first console 100, second console 200, and jig assembly 10 with outer walls of the first console 100 and second console 200 shown in cross-section.

As shown in FIG. 1, first console 100 is connected to second console 200 by the jig assembly 10, which positions the first console 100 and second console 200 with respect to each other (e.g., at a specified lateral spacing and relative longitudinal positions) in addition to connecting the first and second consoles 100, 200 to prevent relative motion therebetween in the lateral and/or longitudinal directions. Consoles 100 and 200 may be supported on a floor or on a table, desktop, or counter top, or one of consoles 100 and 200 may be supported on the floor and the other supported on a table, desktop, or countertop.

In some embodiments, first console 100 is a conveyor console (or instrument console) that comprises an analyzer (e.g., as defined above). Exemplary analyzers include analyzers described in U.S. Pat. Nos. 8,731,712 and 9,732,374, and in International Publication No. WO 2019/014239, and are embodied in the Panther® and Panther Fusion® systems available from Hologic, Inc. (Marlborough, MA).

Second console 200 may contain one or more articles to be transferred from the second console 200 to the first console 100, and the articles may be transferred from the first console 100 back to the second console 200. The articles to be transferred may comprise fluid sample receptacles (e.g., test tubes) containing a fluid sample material on which one or more reactions and/or processes are performed in the console 100, for example, by transferring some or all of the fluid sample from the transferred sample receptacle into a reaction receptacle contained within console 100, combining the sample material with one or more reagents, and performing an assay (e.g., a molecular assay) or other test on the sample material within the first console 100.

In some embodiments second console 200 is a conveyor console that comprises a conveyor 202, e.g., an entire conveyor (e.g, as defined above) or a portion of a conveyor, that transports fluid receptacles or other articles. Exemplary conveyor track assemblies and instruments are described in U.S. Pat. Nos. 9,766,258 and 9,776,811, U.S. Published Patent Application No. 2017/0254827, and International Application Publication No. WO 2021/216932 and are embodied in commercially available systems from Flex-Link, Inpeco (Flexlab, FlexLab-HT, etc.), Integrated Drive Systems (e.g., IDS-CLAS-XI), Thermo Fisher Scientific, Hitachi, MagneMotion, GLP, etc.

Referring to FIGS. 1 and 3, conveyor 202 may transport receptacles 206 (e.g., test tubes) supported within carriers 204 that are supported on and transported by the conveyor 202. Exemplary carriers for releasably holding a receptacle 206 and transporting the receptacle 206 on conveyor 202 are described in U.S. Pat. Nos. 7,485,264, 8,147,778, 10,041,965, and 10,386,381; U.S. Published Patent Application Nos. 2006/0222573; 2017/0153262; 2017/0248623; 2018/0052183; and 2021/0061584. The individual carriers may be conveyed by motive elements, e.g., a conveyor associated with the track or the carrier itself may be self-propelled along a passive track. In an embodiment in which the sample receptacles are self-supporting on a receptacle conveyance, a carrier for supporting the sample receptacle may be omitted.

Figure 5:
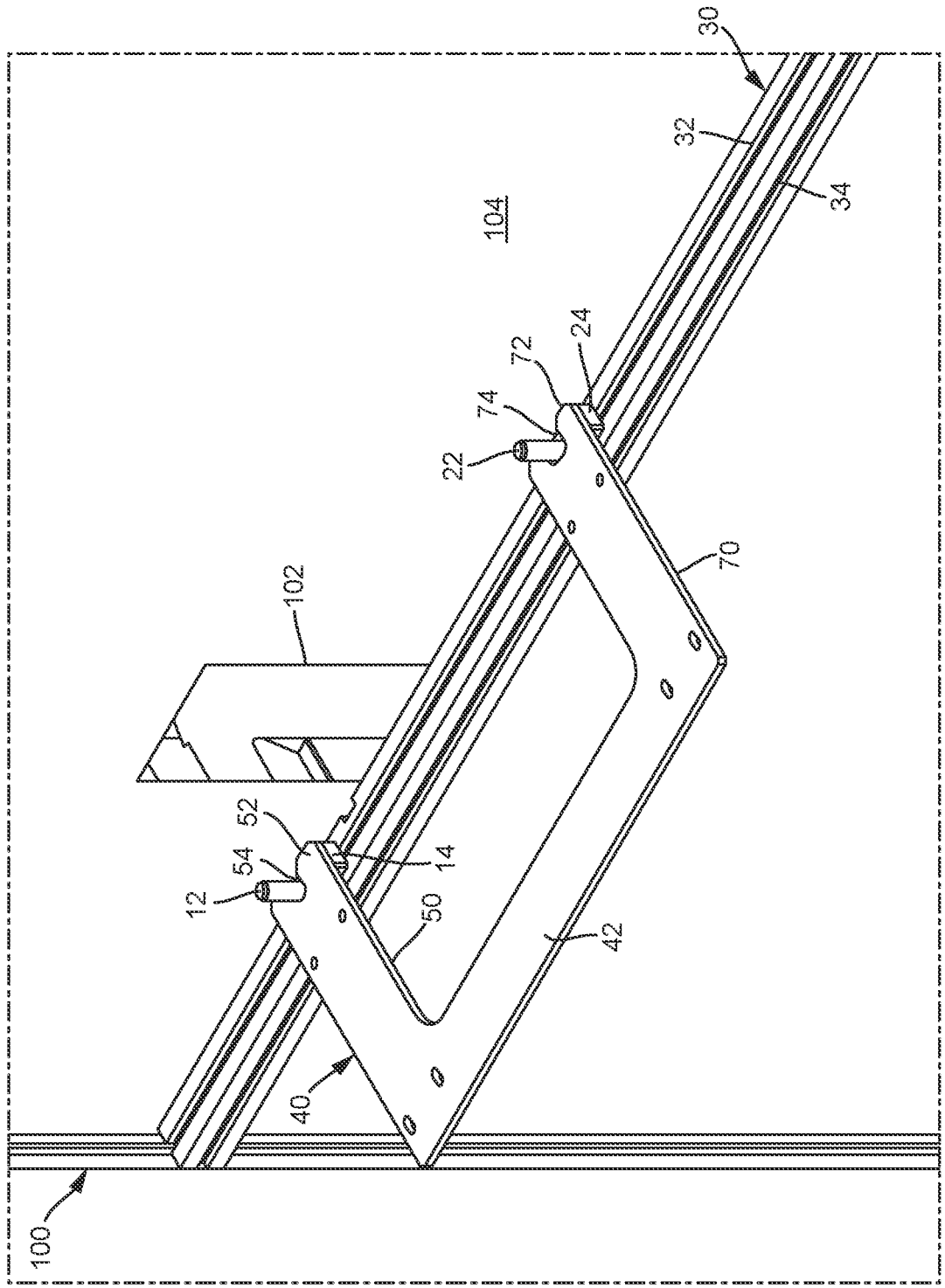
FIG. 5 is a partial top, rear perspective view of the jig assembly and the first consol.

Referring to FIGS. 1, 2, 3, and 5, the article transport 150 may extend through a portal 102 formed in a wall 104 of the first console 100 (the article transport 150 is omitted from FIG. 5). Portal 102 may be omitted if wall 104 is omitted. Where the articles being transported between consoles 100 and 200 are sample receptacles, the article transport 150 may comprise a receptacle transport shuttle, for example, as described in International Patent Application Publication No. WO 2020/226969. Second console 200 may include a transfer robot 250, which may comprise a pick and place robot having a gripper 252 for grasping the receptacles 206 and lifting them out of their respective carriers 204. Gripper 252 may comprise an automated gripping mechanism, for example as described in International Patent Application Publication No. WO 2022/087233. Transfer robot 250 may include an arm or gantry that extends, or is extendable, in the lateral direction from the second console 200 toward the first console 100 to deposit an article, such as a receptacle 206, that is removed from the second console 200 into the article transport 150. Article transport 150 then transports, or shuttles, the receptacle 206 into the first console 100. After processing of the article within the first console 100 is complete, for example, after sample material is removed from a fluid receptacle 206, the article is transported out of the first console 100 by the article transport 150 to be picked up by the transfer robot 250 and transported back into the second console 200, e.g., back to the carrier 204 on the conveyor 202.

In another embodiment, a structure other than an article or receptacle transport 150 may extend between the consoles 100, 200. For example, one or more fluid ducts, wire or cable ducts or wire or cable trays may extend between the spaced-apart consoles 100, 200. In this regard, the receptacle or article transport 150 and/or other structure(s) extending between consoles 100, 200 may be referred to as intervening structure.

In an alternate embodiment, as opposed to a pick and place gripper, transfer robot 250 may comprise a conveyor or other apparatus (not shown) configured to transport a receptacle or other article from the second console 200 to the article transport 150. In another embodiment, the second console 200 does not include a transfer robot, but, instead, the article transport 150 extends directly into the second console 200 and is configured to extract a receptacle or other articles from the second console 200, e.g., from the conveyor, and transport the extracted receptacle into the first console 100.

Referring to FIGS. 1, 2, 4, and 5, the jig assembly 10 includes a first positioning pin 12 and a second positioning pin 22. First and second positioning pins 12, 22 are fixed with respect to the first console 100 on opposite sides of the article transport 150 (and opposite sides of the portal 102 if the first console 100 includes a portal). Jig assembly 10 further includes a positioning connection bracket 40 that is attachable to the second console 200 and generally has a U-shape with a longitudinal span 42 and first and second transverse legs 50, 70 extending from longitudinally-spaced locations on the longitudinal span 42 (e.g., from opposed, longitudinal ends of the longitudinal span 42) so as to straddle the article transport 150 (and/or other structure(s) extending between consoles 100, 200) (i.e., the intervening structure) with each of the transverse legs 50, 70 disposed on an opposite side of the article transport 150 (and/or other structure(s)). In the illustrated embodiment, first and second transverse legs 50, 70 are generally perpendicular to the longitudinal span 42. In other embodiments, not shown, one or both transverse legs is oriented at an acute or obtuse angle with respect to the longitudinal span 42. Positioning bracket 40 may be made of a strong and rigid material, including a machinable metal, such as steel or aluminum.

Figure 4:
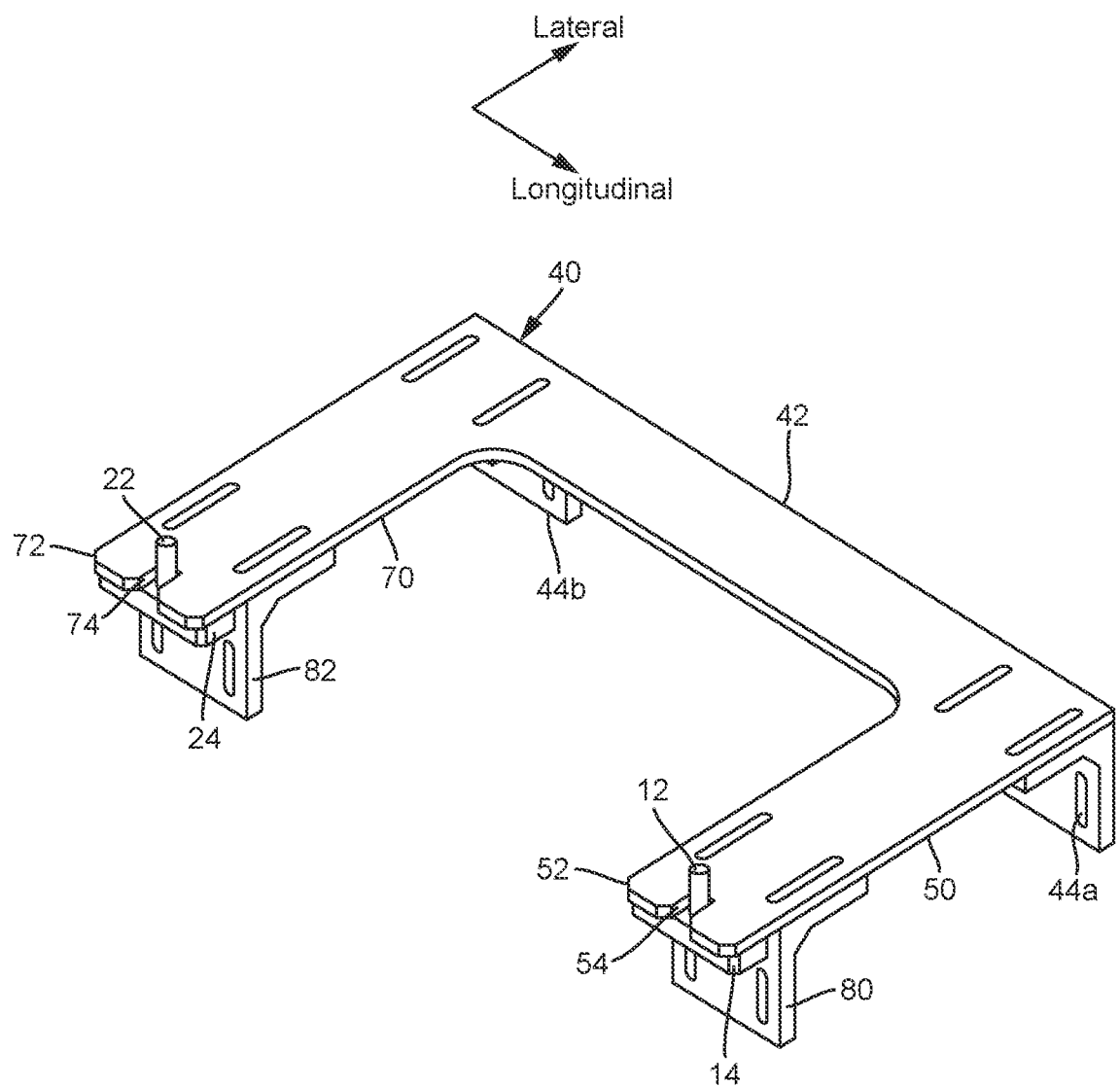
FIG. 4 is a top, front perspective view of the jig assembly.

The positioning connection bracket 40 may be secured to a mounting rail 210 (see FIGS. 1, 2, and 3) by connecting brackets 44a, 44b (see FIGS. 2, 3, and 4, connecting brackets 44a, 44b are omitted from FIG. 5). Connecting brackets 44a, 44b may comprise right angle, or L-shaped, brackets secured to the mounting rail 210 and to the positioning connection bracket 40 by suitable fasteners, such as, bolts, screws, rivets, etc.

In an alternate embodiment, the positioning connection bracket 40 is attached directly to second console 200, e.g., by means of suitable fasteners extending through, or otherwise fixed to the first transverse leg 50, the second transverse leg 70, and/or the longitudinal span 42 and fastened directly to a portion of the second console 200 or to the mounting rail 210, and the connecting brackets 44a, 44b may be omitted.

The positioning connection bracket 40 is preferably secured to the second console 200 at a specific location with respect to a position at which a receptacle or other article is removed from the second console 200 by the transfer robot 250 to be transported to the article transport 150. This pick-up position is represented by reference number 208 in FIG. 1. Where console 200 comprises a conveyor 202, console 200 may include a holding/stopping mechanism (not shown) for stopping the receptacle 206 and associated carrier 204 at the pick-up position 208. Thus, in some embodiments the positioning connection bracket 40 is positioned at a specified location with respect to the pick-up position 208, for example, by positioning the bracket 40 so that an outer edge of the first transverse leg 50 or second transverse leg 70 is at a prescribed distance from the pick-up position 208.

Figure 7:
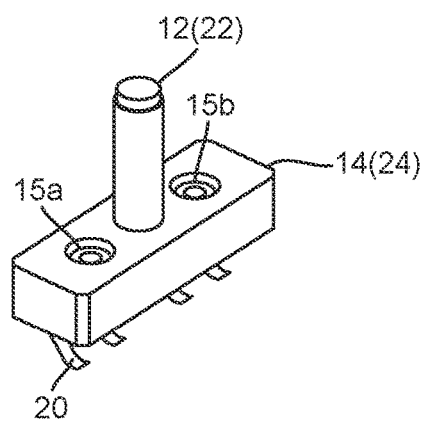
FIG. 7 is a perspective view of a positioning pin and mounting block.
Figure 8:
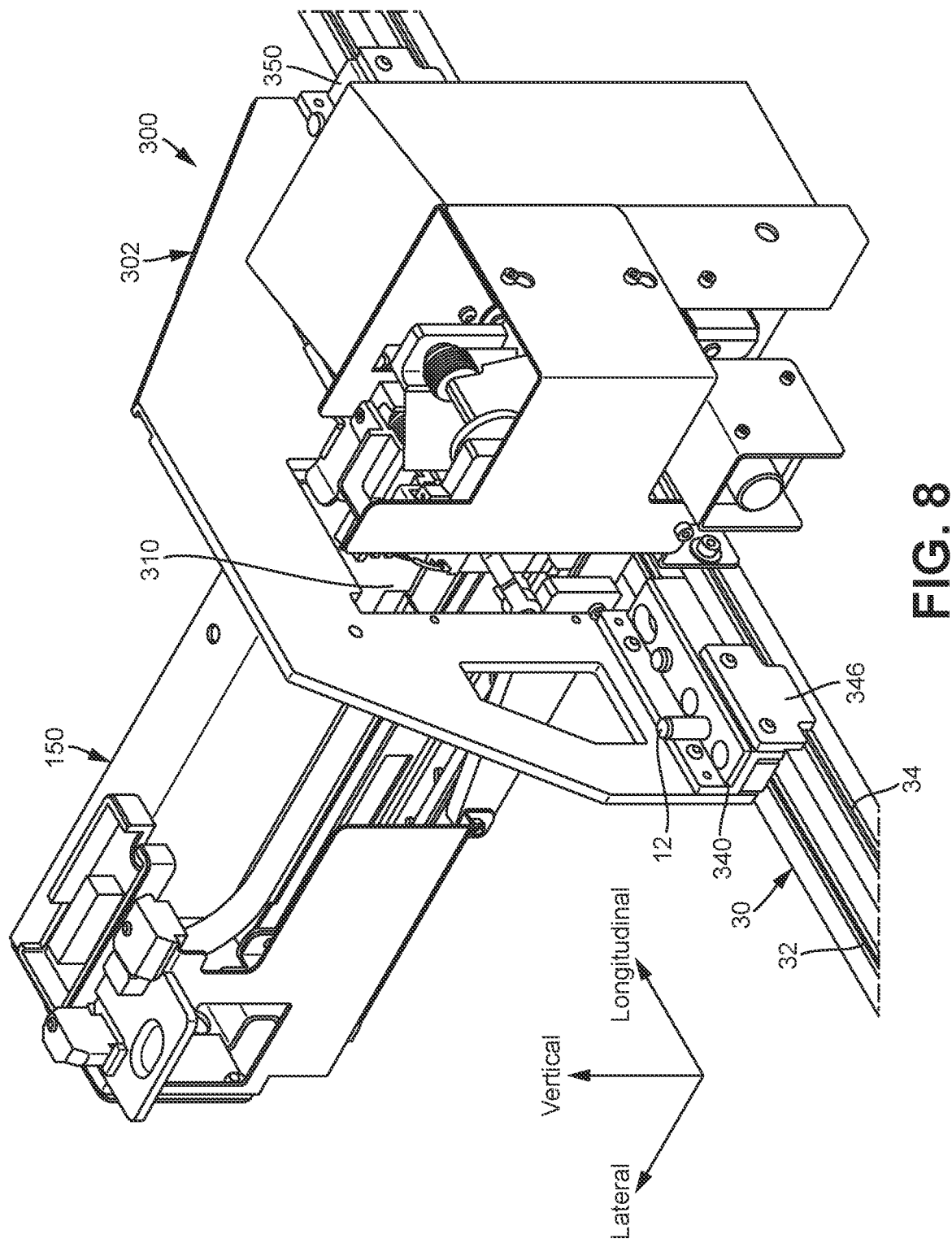
FIG. 8 is a top perspective view of a receptacle transport shuttle and a mounting rail of the jig assembly along with a pin installation jig for locating first and second positioning pins of the jig assembly

In an embodiment as shown in FIGS. 1, 2, and 3, first positioning pin 12 and second positioning pin 22 are fixed with respect to the first console 100 by means of attachment to a mounting rail 30 attached to the first console 100. Mounting rail 30 may include an extrusion profile rail with a top track 32 and a side track 34 (see FIG. 2). As shown in FIGS. 2, 3, 4, 5, and 7, first positioning pin 12 is attached to a first mounting block 14, and second positioning pin 22 is attached to a second mounting block 24. Mounting blocks 14 and 24 are secured to a top side of the mounting rail 30 by means of a connector, such as one or more T-slot nuts, disposed within the top track 32 on the top side of the mounting rail 30. The first and second mounting blocks 14, 24, are able to slide longitudinally along the top track 32, while being vertically restrained by the T-slot nuts positioned within the top track 32 so as to permit adjustment of the longitudinal positioning of the mounting blocks 14, 24 within the top track 32. The T-slot nuts may include leaf springs 20 (see FIG. 7) or other friction-causing components to restrict the longitudinal movement of the nut within the top track 32. FIG. 7 shows both mounting blocks 14 and 24, which may be identical. Each of the first and second mounting blocks 14, 24 and the corresponding first and second positioning pins 12, 22 is positioned at a respective longitudinal position on the mounting rail 30 by tightening fasteners (e.g., bolts) extending into the T-slot nuts to secure the mounting block within the top track 32 of the mounting rail 30. In that regard, fastener 15a, 15b (e.g., screws or bolts) extend through each of the mounting blocks 14, 24 into respective T-slot nuts disposed within the top track 32.

First and second positioning pins 12, 22, can be made of a strong and rigid material, such as steel or aluminum. A manner in which the first positioning pin 12 and second positioning pin 22 are longitudinally located on the mounting rail 30 will be described below.

Referring to FIGS. 4 and 5, a free end 52 of the first transverse leg 50 of the positioning connection bracket 40 has formed therein a first pin recess 54 open in a lateral direction, and a free end 72 of the second transverse leg 70 of the positioning connection bracket 40 has formed therein a second pin recess 74 open in a lateral direction. To position the first console 100 and the second console 200 with respect to each other, with the positioning connection bracket 40 attached to the second console 200 and the first positioning pin 12 and second positioning pin 22 attached with respect to the first console 100, the first console and the second console 200 are positioned so that the first and second positioning pins 12, 22 are aligned with the first and second pin recesses 54, 74, respectively. The first and second consoles 100, 200 are then moved laterally with respect to each other until each of the first and second positioning pins 12, 22 is received within each of the first and second pin recesses 54, 74, respectively. The positioning connection bracket 40 is then attached to the first console 100, thereby connecting the first and second consoles 100, 200 via the positioning connection bracket 40.

Referring to FIG. 4, in an embodiment, the positioning connection bracket 40 is attached to the first console 100 by means of a first leg attachment bracket 80 attached to the first transverse leg 50 and to the first console 100, e.g., to the side track 34 of the mounting rail 30, and a second leg attachment bracket 82 attached to the second transverse leg 70 and to the first console 100, e.g., to the side track 34 of the mounting rail 30. First and second leg attachment brackets 80, 82 may comprise right angle, or L-shaped, brackets and may be attached to the first and second transverse legs 50, 70, respectively, by suitable fasteners, such as bolts, screws, rivets, etc. First and second leg attachment brackets 80, 82 may be attached to the first console 100 by suitable bolts extending into T-slot nuts disposed within side track 34 of mounting rail 30 (see FIG. 3 showing T-slot nut 84 of first leg attachment bracket 80 disposed within the side track 34 of mounting rail 30). First and second leg attachment brackets 80, 82 are omitted from FIG. 5.

In an alternate embodiment, the positioning connection bracket 40 is attached to directly to first console 100, e.g., by means of suitable fasteners extending through, or otherwise fixed to the first transverse leg 50 and the second transverse leg 70 and fastened directly to a portion of the first console 100 or to the mounting rail 30, and the first leg attachment bracket 80 and second leg attachment bracket 82 may be omitted.

Figure 6:
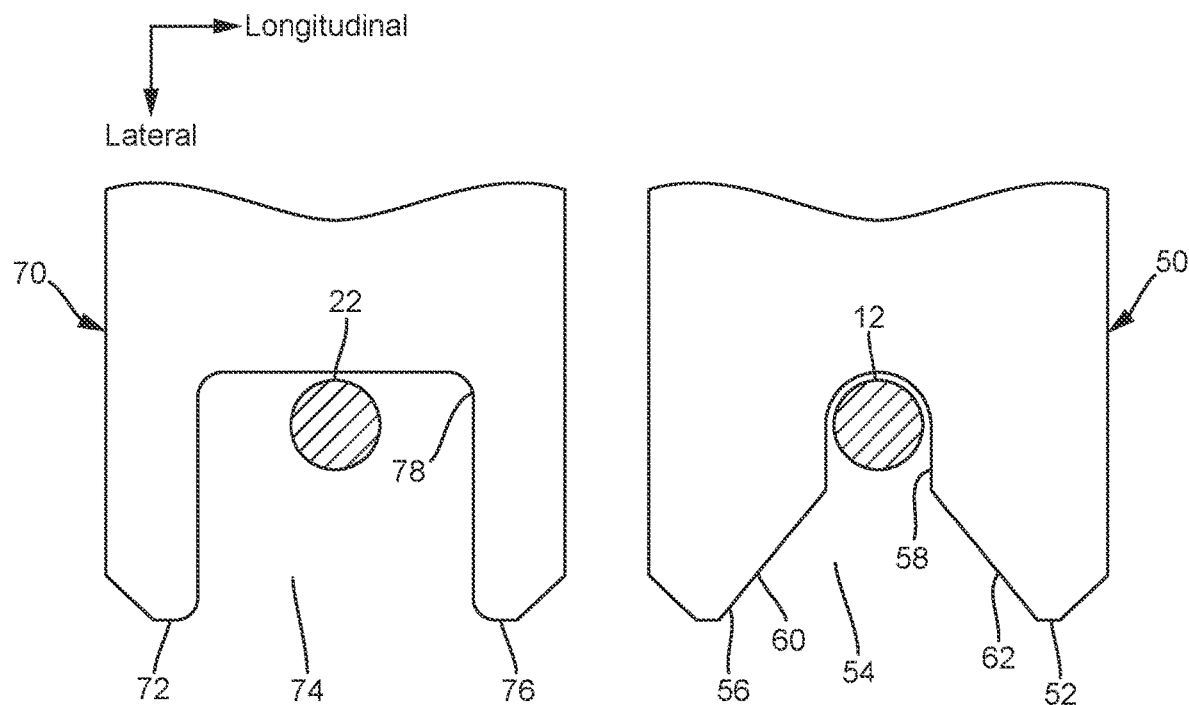
FIG. 6 is a partial plan view of the free ends of first and second transverse legs of a positioning connection bracket of the jig assembly.

FIG. 6 is a partial plan view of the free end 52 of first transverse leg 50 and the free end 72 of the second transverse leg 70.

First pin recess 54 has an opening, or mouth, 56 and a pin capture portion 58 at a closed end of the pin capture recess 54 within which the first positioning pin 12 is received when the pin 12 is captured in the first pin recess 54. The width of the pin capture portion 58 in the longitudinal direction may be about the same, but is preferably slightly larger than, the width (e.g., diameter) of the first positioning pin 12. Accordingly, the pin capture portion 58 is preferably about as wide as the first positioning pin 12, meaning that the first positioning pin 12 is able to readily move laterally into and out of the pin capture portion 58, but relative longitudinal movement between the pin capture portion 58 the first positioning pin 12 is substantially limited.

Opening 56 may be substantially wider in the longitudinal direction than the width of the first positioning pin 12. First pin recess 54 may further include angled sides 60, 62 extending from the opening 56 to the pin capture portion 58.

Second pin recess 74 has an opening 76 and a pin capture portion 78 at a closed end of the recess. Opening 76 and pin capture portion 78 may be substantially the same width in the longitudinal direction, e.g., where opposed sides of the second pin recess 74 are straight and substantially parallel and are preferably substantially wider in the longitudinal direction than the width (diameter) of the second positioning pin 22. For example, the width of the opening 76 and pin capture portion 78 may be at least 1.5× the width (diameter) of the second positioning pin 22. In another embodiment, the opining 76 is wider than the pin capture portion 78, and the pin capture portion 78 is substantially wider in the longitudinal direction (e.g, 1.5X or more) than the width (diameter) of the second positioning pin 22.

The wide opening 56 of the first pin recess 54 (relative to the width of the first positioning pin 12) and wide opening 76 of the second pin recess 74 (relative to the width of the second positioning pin 22) allow the first and second pin recesses 54, 74 to capture the first and second positioning pins 12, 22, respectively, even if the first and second positioning pins 12, 22 are not perfectly aligned with the centers of the first and second pin capture recesses 54, 74 when the first console 100 and second console 200 are moved laterally with respect to each other into the connected position. The narrow longitudinal width of the pin capture portion 58 of the first pin recess 54 restrains relative longitudinal movement between the first transverse leg 50 (and thus between the positioning connection bracket 40 and the second console 200) with respect to the first positioning pin 12 (and thus with respect to the first console 100). On the other hand, the relatively larger width of the second pin recess 74 avoids the pin connection bracket 40 from being over constrained, whereby the first and second pin recesses 54, 74 of the pin connection bracket 40 are not able to receive the first positioning pin 12 and second positioning pin 22 if the pins 12, 22 are not perfectly aligned with the centers of the respective recesses 54, 74.

Referring to FIGS. 8-11, pin installation jig 300 is configured to facilitate accurate, repeatable positioning of the first positioning pin 12 and the second positioning pin 22 relative to the article transport 150 or the receptacle portal 102. Pin installation jig 300 includes a frame 302 having a clearance opening 310 formed therein. An installation clamp 312 is mounted on one side of and extends into the clearance opening 310. In the illustrated embodiment, installation clamp 312 is slidably mounted in a slot 316 extending in a longitudinal direction from the clearance opening 310, with a spring 318 positioned between an end of the installation clamp 312 and a closed end of the slot 316. Installation clamp 312 may include top and bottom slots that receive the top and bottom edges of the slot 316. The installation clamp 312 is retained within the slot 316, against the force of the compressed spring 318, by a thumbscrew 320 extending through a slotted hole 322 formed in the installation clamp 312 and into a thumb screw hole 324 formed in the frame 302. A standoff 326 extends from the installation clamp 312 and may include a threaded rod extending into a threaded standoff hole 328 formed in the installation clamp 312 to secure the standoff to the installation clamp 312. Standoff 326 may serve as a handle to pull the installation clamp 312 back against the spring 318 when installing or removing the pin installation jig 300.

A first pin positioner 340 is secured to a first end 304 of the frame 302 for setting the position at which the first positioning pin 12 is secured to the mounting rail 30, and a second pin positioner 350 is secured to a second end 306 of the frame 302 for setting the position at which the second positioning pin 22 is secured to the mounting rail 30.

Figure 9:
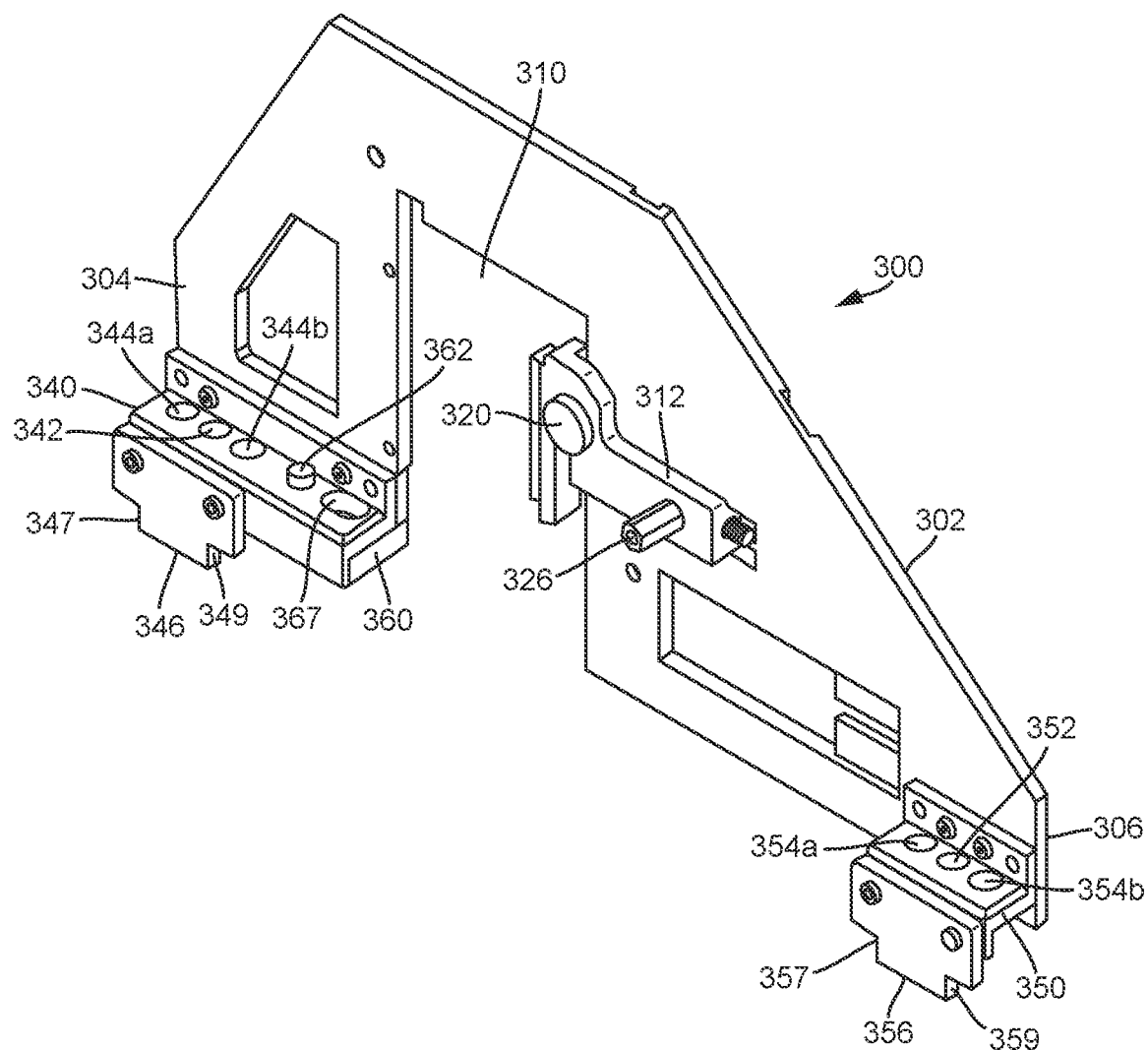
FIG. 9 is a perspective view of the pin installation jig.
Figure 10:
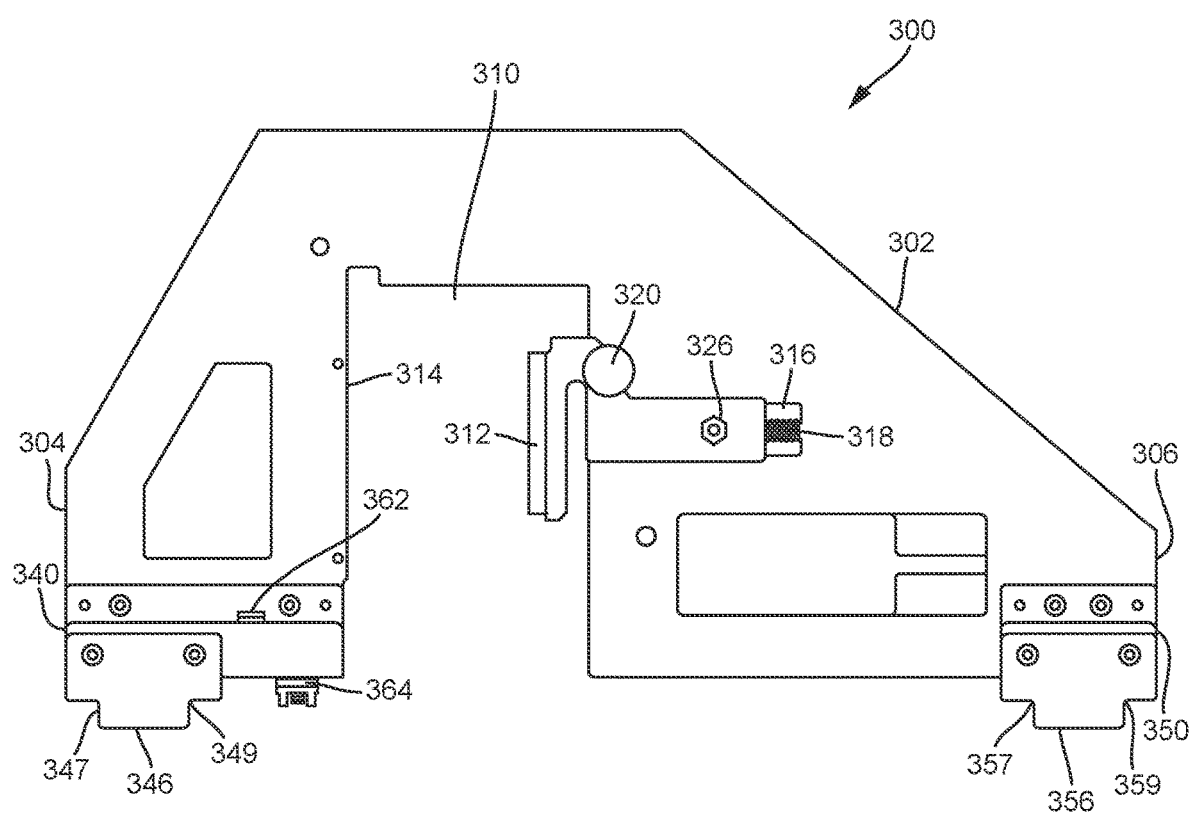
FIG. 10 is a front view of the pin installation jig.
Figure 11:
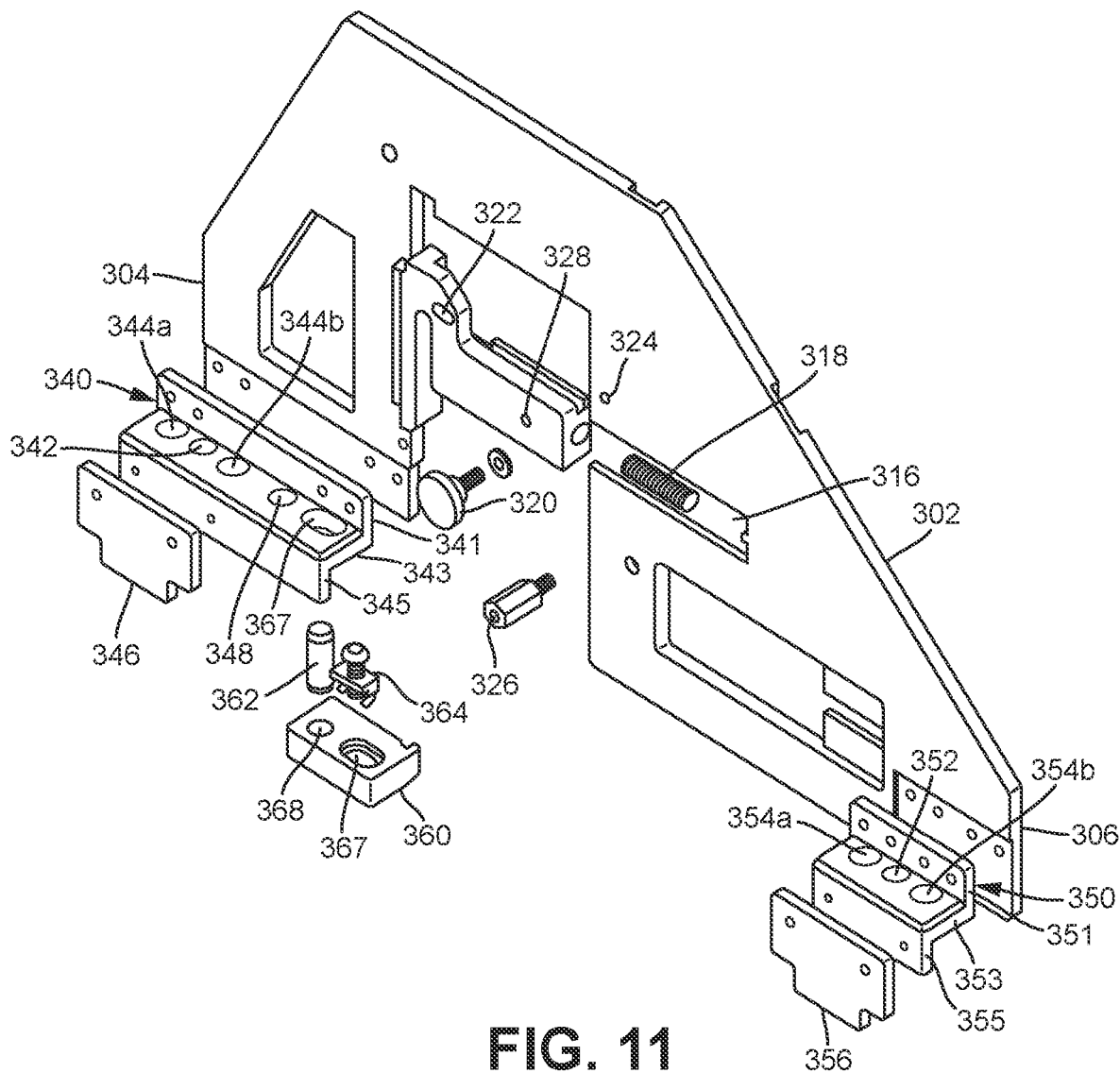
FIG. 11 is an exploded perspective view of the pin installation jig.

Referring to FIG. 11, first pin positioner 340 includes a first vertical portion 341, a horizontal portion 343, and a second vertical portion 345. First pin positioner 340 may be secured to the frame 302 by suitable fasteners, such as, screws, bolts, rivets, dowels, or some combination thereof, extending through the first vertical portion 341 into the frame 302. A first pin location hole 342 and fastener access holes 344a, 344b are formed in the horizontal portion 343 of the first pin positioner 340. A first positioner plate 346 is attached to the second vertical portion 345 of the first pin positioner 340 and may be secured thereto by suitable fasteners, such as, screws, bolts, rivets, dowels, or some combination thereof. As shown in FIGS. 9 and 10, corner cutouts 347, 349 may be formed in the first positioner plate 346.

Referring again to FIG. 11, second pin positioner 350 includes a first vertical portion 351, a horizontal portion 353, and a second vertical portion 355. Second pin positioner 350 may be secured to the frame 302 by suitable fasteners, such as, screws, bolts, rivets, dowels, or some combination thereof, extending through the first vertical portion 351 into the frame 302. A second pin location hole 352 and fastener access holes 354a, 354b are formed in the horizontal portion 353 of the second pin positioner 350. A second positioner plate 356 is attached to the second vertical portion 355 of the second pin positioner 350 and may be secured thereto by suitable fasteners, such as, screws, bolts, rivets, dowels, or some combination thereof. As shown in FIGS. 9 and 10, corner cutouts 357, 359 may be formed in the first positioner plate 346.

Referring to FIGS. 9 and 11, a jig locator 360 may be installed at an underside of the horizontal portion 343 of the first pin positioner 340. A dowel 362 extends through a dowel hole 348 formed in the horizontal portion 343 and into a dowel hole 368 formed in the jig locator 360. A T-nut 364 is positioned in the top track 32 of the mounting rail 30 and is accessible through an elongated T-nut hole 367 formed in the jig locator 360. Jig locator 360 may function as a position datum for positioning the pin installation jig 300 with respect to the article transport 150 and/or other intervening structure extending between the consoles 100, 200.

The following is a procedure for locating the first positioning pin 12 and second positioning pin 22 using the pin installation jig 300. The first mounting block 14, with the first positioning pin 12 attached thereto, is loosely secured to the first console 100, for example, by securing it to the mounting rail 30 with fasteners 15a, 15b threaded into corresponding T-slot nuts (see FIG. 7) disposed within the top track 32 of the mounting rail 30. Fasteners 15a and 15b are loosely tightened so that the first mounting block 14 is able to slide longitudinally along the top track 32. The second mounting block 24, with the second positioning pin 22 attached thereto, is loosely secured to the first console 100, for example, by securing it to the mounting rail 30 on the opposite side of the article transport 150 with fasteners 15a, 15b threaded into corresponding T-slot nuts disposed within the top track 32 of the mounting rail 30. Fasteners 15a and 15b are loosely tightened so that the second mounting block 24 is able to slide longitudinally along the top track 32.

The installation clamp 312 is moved to a retracted position (to the right in FIGS. 9, 10, and 11), e.g., using standoff 326, against the bias of the spring 318 and is secured at that position by tightening the thumb screw 320.

The pin installation jig 300 is then lowered onto the mounting rail 30 with the article transport 150 received within the clearance opening 310 and with the first positioning pin 12 moved longitudinally along the top track 32 into alignment with the first pin location hole 342 of the first pin positioner 340 and the second positioning pin 22 moved longitudinally along the top track 32 into alignment with the second pin location hole 352 of the second pin positioner 350. The thumb screw 320 is then loosened to allow the installation clamp 312 to extend under the force of the spring 318 against a side of the article transport 150, thereby urging the pin installation jig 300 to move longitudinally so that a side 314 of the clearance opening 310 (see FIG. 10) opposite the clamp 312, and/or the jig locator 360, bears against a side of the article transport 150. In this regard, the side 314 of the clearance opening 310 or the jig locator 360 provides a datum for positing the pin installation jig 300 with respect to the article transport 150 and/or other intervening structure extending between consoles 100, 200. The first positioning pin 12 and second positioning pin 22 are now in their proper respective locations with respect to the article transport 150, and the fasteners 15a and 15b extending into first and second mounting blocks 14, 24 can be fully tightened through the fastener access holes 344a, 344b to tighten the first mounting block 14 and through the fastener access holes 354a, 354b to tighten the second mounting block 24 to the mounting rail 30.

Pin installation jig 300 may also facilitate positioning of fasteners and associated T-slot nuts in the side track 34 of the mounting rail 30 for securing the first leg attachment bracket 80 and the second leg attachment bracket 82 to the mounting rail 30. Fasteners are loosely tightened into corresponding T-slot nuts disposed within the side track 34, and, with the pin installation jig 300 supported on the mounting rail 30 in its final aligned position with respect to the article transport 150, the fasteners may be move longitudinally within the side track 34 to position them in the cut outs 347, 349 of the first positioner plate 346 and in the cutouts 357, 359 of the second positioner plate 356 so as to position the corresponding T-slot nuts along the side track 34 to properly locate first leg attachment bracket 80 and the second leg attachment bracket 82 on the mounting rail 30.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the scope of the following appended claims.

The invention claimed is:

1. A system comprising:
a conveyor console including a conveyor configured to transport fluid receptacles;
an instrument console;
a transport shuttle coupled to the instrument console and configured to transport fluid receptacles removed from the conveyor into and out of the instrument console; and
a jig assembly for positioning the instrument console with respect to the conveyor console and connecting the instrument console to the conveyor console, wherein the jig assembly comprises:
first and second positioning pins configured to be releasably fixed to the instrument console at horizontally spaced apart positions on opposed sides of the transport shuttle;
a positioning connection bracket attached to the conveyor console and comprising a longitudinal span and first and second transverse legs extending laterally from longitudinally spaced-apart locations on the longitudinal span;
a first pin recess formed in a free end of the first transverse leg, wherein the first positioning pin is received within the first pin recess;
a second pin recess formed in a free end of the second transverse leg, wherein the second positioning pin is received within the second pin recess;
a first leg attachment bracket connecting the first transverse leg to the instrument console; and
a second leg attachment bracket connecting the second transverse leg to the instrument console.

2. The system of claim 1, wherein the jig assembly further comprises a mounting rail attached to the instrument console in a horizontal, longitudinally-extending orientation and having a longitudinally-extending top track formed at a top side thereof, wherein each of the first and second positioning pins is configured to be slidably coupled to the top track and to be non-slidably fixed to the mounting rail to fix the respective first and second positioning pins with respect to the instrument console.

3. The system of claim 2, wherein the first positioning pin is secured to a first mounting block, and the first mounting block is fixed to the mounting rail by fasteners extending through the first mounting block into T-slot nuts disposed in the top track, and wherein the second positioning pin is secured to a second mounting block, and the second mounting block is fixed to the mounting rail by fasteners extending through the second mounting block into T-slot nuts disposed in the top track.

4. The system of claim 2, wherein the mounting rail has a longitudinally-extending side track formed at a side thereof, and wherein each of the first and second leg attachment brackets is fixed to the side track of the mounting rail.

5. The system of claim 2, wherein the mounting rail comprises an extrusion profile rail.

6. The system of claim 1, wherein the first pin recess is defined by an opening that is wider than a width of the first positioning pin, a pin capture portion that is about as wide as the width of the first positioning pin to permit the first positioning pin to move laterally into and out of the pin capture portion but restrict longitudinal movement of the first positioning pin within the pin capture portion, and inwardly angled sides extending from the opening to the pin capture portion.

7. The system of claim 6, wherein the second pin recess is wider than a width of the second positioning pin to permit the second positioning pin to move longitudinally within the second pin recess.

8. The system of claim 1, wherein the instrument console comprises a housing wall and further includes a receptacle portal formed in the housing wall through which fluid receptacles are transported into or out of the instrument console by the transport shuttle.

9. The system of claim 1, wherein the conveyor console includes a transfer robot configured to transfer fluid receptacles from a transfer position on the conveyor to the transport shuttle and from the transport shuttle to the transfer position on the conveyor.

10. The system of claim 9, wherein the transfer robot comprises a pick and place gripper.

11. The system of claim 1, wherein the first and second transverse legs are substantially perpendicular to the longitudinal span.

12. The system of claim 1, further comprising first and second connecting brackets for connecting the positioning connection bracket to the conveyor console.

13. The system of claim 1, further comprising a pin installation jig, wherein the pin installation jig comprises:
a frame, with a clearance opening formed therein;
an installation clamp slidably attached to the frame and extending into the clearance opening;
a first pin positioner attached to the frame and including a first pin location hole formed therein; and
a second pin positioner attached to the frame and including a second pin location hole formed therein; wherein the pin installation jig is configured to be coupled to the instrument console with the transport shuttle disposed within the clearance opening, and the installation clamp is configured to bear against one side of the transport shuttle to urge a datum of the pin installation jig against an opposite side of the transport shuttle, wherein the first positioning pin is configured to be moved into alignment with and through the first pin location hole of the first pin positioner before the first positioning pin is fixed with respect to the instrument console, and wherein the second positioning pin is configured to be moved into alignment with and through the second pin location hole of the second pin positioner before the second positioning pin is fixed with respect to the instrument console.

14. The system of claim 13, wherein the installation clamp is slidably mounted to the frame and is spring biased into contact with the transport shuttle.

15. The system of claim 14, wherein the pin installation jig further comprises a thumb screw that extends through an opening formed in the installation clamp and into the frame to be selectively tightened to retain the installation clamp in a retracted position.

16. A system comprising:
a first console;
a second console holding one or more articles;
an article transport configured to transport articles removed from the second console to the first console; and
a jig assembly for positioning the first console with respect to the second console and connecting the first console to the second console, wherein the jig assembly comprises:
first and second positioning pins attached to the first console at horizontally spaced apart positions on opposed sides of the article transport;
a positioning connection bracket attached to the second console and comprising a longitudinal span and first and second transverse legs extending laterally from longitudinally spaced-apart locations on the longitudinal span;
a first pin recess formed in a free end of the first transverse leg, wherein the first positioning pin is received within the first pin recess;
a second pin recess formed in a free end of the second transverse leg, wherein the second positioning pin is received within the second pin recess;
a first leg attachment bracket connecting the first transverse leg to the first console; and
a second leg attachment bracket connecting the second transverse leg to the first console.

17. A method for positioning a first console with respect to a second console and connecting the first console to the second console, wherein the method comprises:
(a) attaching first and second positioning pins to the first console at horizontally spaced apart positions on opposed sides of an intervening structure extending between the first console and the second console;
(b) attaching a positioning connection bracket to the second console, wherein the positioning connection bracket comprises a longitudinal span and first and second transverse legs extending laterally from longitudinally spaced-apart locations on the longitudinal span, wherein the first transverse leg includes a first pin recess formed in a free end thereof and the second transverse leg includes a second pin recess formed in a free end thereof;
(c) aligning the first pin recess the with first positioning pin;
(d) aligning the second pin recess with the second positioning pin;
(e) moving one or both of the first and second consoles toward each other in the lateral direction until the first positioning pin is received in the first pin recess and the second positioning pin is received in the second pin recess;
(f) connecting the first transverse leg to the first console; and
(g) connecting the second transverse leg to the first console.

18. The method of claim 17, wherein step (f) comprises connecting the first transverse leg to the first console with a first leg attachment bracket, and step (g) comprises connecting the second transverse leg to the first console with a second leg attachment bracket.

19. The method of claim 17, wherein step (a) comprises:
coupling a pin installation jig to the first console with the intervening structure disposed within a clearance opening formed in the pin installation jig and urging the pin installation jig in the longitudinal direction so that a datum of the installation jig bears against a side of the intervening structure;

moving the first positioning pin into alignment with, and inserting the first positioning pin through, a first pin location hole of the pin installation jig and then fixing the first positioning pin with respect to the first console; and moving the second positioning pin into alignment with, and inserting the second positioning pin through, a second pin location hole of the pin installation jig and then fixing the second positioning pin with respect to the first console.

20. The method of claim 17, wherein step (a) comprises:

attaching a mounting rail to the first console in a horizontal, longitudinally-extending orientation, wherein the mounting rail includes a top track formed at a top side thereof;

slidably coupling the first and second positioning pins to the top track;

sliding each of the first and second positioning pins along the top track to respective, desired positions; and fixing the respective first and second positioning pins to the mounting rail.

21. The method of claim 17, wherein step (b) comprises attaching the positioning connection bracket to the second console with first and second connecting brackets.

22. The method of claim 17, wherein the intervening structure comprises an article transport, and wherein the method further comprises transferring articles between the first and second consoles with the article transport.

\* \* \* \* \*